US006893077B1

United States Patent
DeJongh

(10) Patent No.: US 6,893,077 B1
(45) Date of Patent: May 17, 2005

(54) DOOR TRIM PANEL HAVING DEFORMABLE ARMREST

(75) Inventor: Mark Alan DeJongh, Ypsilanti, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 0 days.

(21) Appl. No.: 10/803,487

(22) Filed: Mar. 18, 2004

(51) Int. Cl.[7] ............................. B60J 5/04; B60R 21/04
(52) U.S. Cl. ........................ 296/187.05; 296/1.09; 296/146.7; 296/153
(58) Field of Search ........................ 296/1.09, 153, 296/152, 146.7, 187.05

(56) References Cited

U.S. PATENT DOCUMENTS

| | | | | |
|---|---|---|---|---|
| 2,922,674 | A | * | 1/1960 | Hollerbach ................ 296/153 |
| 4,783,114 | A | * | 11/1988 | Welch ....................... 296/153 |
| 5,527,084 | A | * | 6/1996 | Scherf ....................... 296/153 |
| 5,749,600 | A | * | 5/1998 | Yamada et al. ............. 280/751 |
| 5,951,094 | A | * | 9/1999 | Konishi et al. ............. 296/153 |
| 6,248,205 | B1 | * | 6/2001 | Scheidmantel et al. .. 156/309.6 |
| 6,409,249 | B1 | * | 6/2002 | Han ........................ 296/146.7 |
| 6,615,546 | B2 | * | 9/2003 | Furuyama et al. ............ 49/502 |

FOREIGN PATENT DOCUMENTS

| | | |
|---|---|---|
| JP | 07-117596 | 5/1995 |
| JP | 08-011537 | 1/1996 |
| JP | 2972137 | 8/1999 |
| JP | 2002-046520 | 2/2002 |

* cited by examiner

*Primary Examiner*—D. Glenn Dayoan
*Assistant Examiner*—Greg Blankenship
(74) *Attorney, Agent, or Firm*—Gifford, Krass, Groh, Sprinkle, Anderson & Citkowski, P.C.

(57) ABSTRACT

A door trim panel assembly is provided for an automotive vehicle. The panel assembly includes an armrest having an inner edge and an outer edge. The panel assembly also includes an upper panel and a lower panel. The upper panel has a support wall for supporting the inner edge of the armrest. The support wall has a distal end. The lower panel includes a support flange for supporting the outer edge of the armrest. The support flange has a distal end. A frangible connection extends between the distal ends of the support wall and the support flange. The armrest includes a plurality of longitudinally extending grooves. During a side vehicle impact, the grooves allow the armrest to deform transversely and the frangible connection breaks to absorb energy associated with the impact.

12 Claims, 1 Drawing Sheet

US 6,893,077 B1

DOOR TRIM PANEL HAVING DEFORMABLE ARMREST

BACKGROUND OF THE INVENTION

1. Field of the Invention

The invention relates to a door trim panel for an automotive vehicle. More particularly, the invention relates to an armrest on the panel that is deformable to absorb energy associated with a side impact.

2. Description of the Related Art

Door assemblies for automotive vehicles include a rigid door frame and an inner trim panel for covering the inner surface of the door frame. Typically, the inner trim panel includes an armrest fixedly secured to or integrally formed with the inner trim panel. The armrest must be firm enough to support an arm of an occupant or the weight of the occupant while leaning on the arm supported on the armrest. It remains desirable, however, to provide a trim panel and an armrest designed to absorb energy associated with a side vehicle impact.

SUMMARY OF THE INVENTION

According to one aspect of the invention, a door trim panel assembly is provided for an automotive vehicle having an armrest that supports an arm of an occupant and is deformable to absorb energy associated with a side vehicle impact. The armrest includes an inner edge and an outer edge. The door trim panel also includes an upper panel and a lower panel. The upper panel has a side wall and a support wall extending transversely from the side wall for supporting the inner edge of the armrest. The support wall has a distal end. The lower panel includes a side wall and a support flange extending transversely from the side wall of the lower panel for supporting the outer edge of the armrest. The support flange has a distal end. The distal end of the support wall and the distal end of the support flange have a frangible connection to absorb energy associated with a side vehicle impact and allow transverse displacement of the support flange relative to the support wall.

BRIEF DESCRIPTION OF THE DRAWINGS

Advantages of the present invention will be readily appreciated as the same become better understood by reference to the following detailed description when considered in connection with the accompanying drawings, wherein.

DETAILED DESCRIPTION OF THE PREFERRED EMBODIMENT

Figure 1:
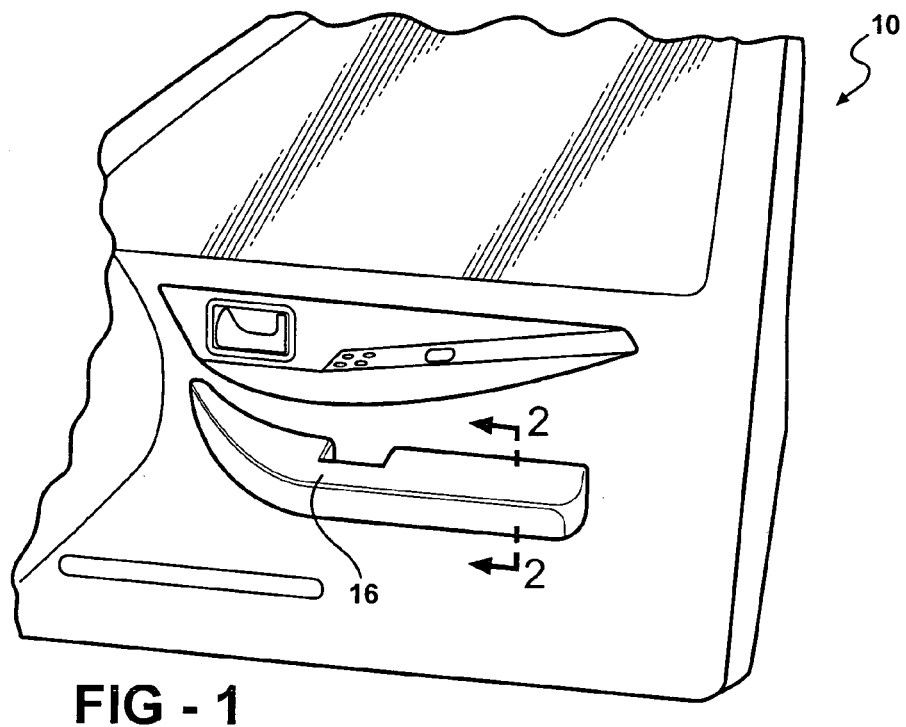
FIG. 1 is a perspective view of a door trim panel according to the invention.
Figure 2:
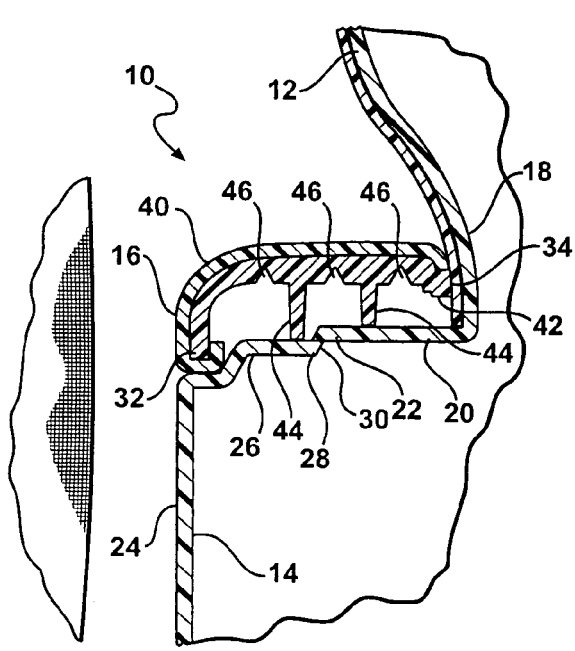
FIG. 2 is a cross sectional view of the door trim panel and an armrest according to the invention.
Figure 3:
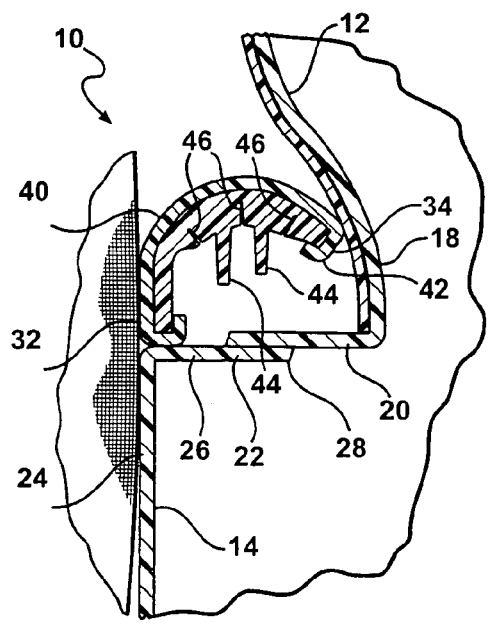
FIG. 3 is a cross sectional view of the door trim panel and the armrest during a vehicle side impact.

A door trim panel for covering an inner side of a door of an automotive vehicle is generally indicated at 10 in FIGS. 1 through 3. The door trim panel assembly 10 includes an upper panel 12, a lower panel 14 and an armrest 16. Described in detail below, the upper 12 and lower 14 panels and the armrest 16 deform to absorb energy during a side vehicle impact.

The upper panel 12 includes a side wall 18 and a support wall 20. The support wall 20 extends transversely from the side wall 18 in a generally L-shaped arrangement. The support wall 20 includes a distal end 22. The lower panel 14 includes a side wall 24 and a support flange 26 that extends orthogonally from the side wall 24 of the lower panel 14. The support flange 26 includes a distal end 28. A frangible connection or web 30 extends between the distal ends 22, 28 such that the support wall 20 and flange 26 are stepped in a vertical sense, as viewed from the perspective shown in the figures.

The armrest 16 is fixedly secured to the upper 12 and lower 14 panels by any suitable method, such as by a heat staking process. Specifically, the armrest 16 is disposed longitudinally along the support wall 20 and flange 26. An outer edge 32 of the armrest 16 is fixedly secured to the lower panel 14. An inner edge 34 of the armrest 16 is fixedly secured to the upper panel 12. The armrest 16 includes opposite top 40 and bottom 42 surfaces each extending generally transversely between the outer 32 and inner 34 edges. A plurality of longitudinally extending ribs 44 projects outwardly from the bottom surface 42 of the armrest 16 and abuts the support wall 20 and flange 26 to support the weight of an occupant placed on the top surface 40 of the armrest 16. The ribs 44 are transversely spaced apart. A plurality of longitudinally extending grooves 46 are formed in the bottom surface 42 and are disposed between the ribs 44. Each groove 46 has a generally inverted V-shaped cross section to allow the armrest 16 to deform upwardly and transversely and, thereby, absorb energy associated with a side vehicle impact.

During a side vehicle impact, a transverse loading of the lower panel 14 relative to the upper panel 12 creates a shearing force in the web 30. Eventually, the web 30 shears, which allows a transverse displacement of the support flange 26 relative to the support wall 20. At the same time, the grooves 46 allow the armrest 16 to buckle as the outer edge 32 is displaced transversely with the support flange 26 of the lower panel 14. The shearing and buckling actions of the web 30 and the armrest 16, respectively, absorb energy associated with the side vehicle impact.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A door trim panel assembly for an automotive vehicle, said door trim panel assembly comprising:

an armrest having an inner edge and an outer edge;

an upper panel having a side wall and a support wall extending transversely from said side wall for supporting said inner edge of said armrest, said support wall having a distal end;

a lower panel having a side wall and a support flange extending transversely from said side wall of said lower panel for supporting said outer edge of said armrest, said support flange having a distal end, said distal end of said support wall and said distal end of said support flange having a frangible connection to absorb energy associated with a side vehicle impact and allow transverse displacement of said support flange relative to said support wall.

2. A door trim panel as set forth in claim 1, wherein said armrest includes a top surface and an opposite bottom surface, said armrest having a plurality of support ribs projecting between said bottom surface and said support wall and flange.

3. A door trim panel as set forth in claim 2, wherein said armrest includes a plurality of grooves formed in said bottom surface to allow said armrest to buckle transversely during said transverse displacement of said support flange relative to said support wall and, thereby, absorb energy associated with the side vehicle impact.

4. A door trim panel as set forth in claim 3, wherein said plurality of grooves are disposed longitudinally along said bottom surface of said armrest.

5. A door trim panel as set forth in claim 4, wherein said plurality of grooves are disposed between said plurality of support ribs.

6. A door trim panel as set forth in claim 5, wherein each of said plurality of grooves has a generally V-shaped cross section.

7. A door trim panel as set forth in claim 6, wherein said top and bottom surfaces of said armrest extend transversely between said outer edge and said inner edge.

8. A door trim panel as set forth in claim 7, wherein said outer edge of said armrest is displaced transversely with said support flange to absorb energy associated with the side vehicle impact.

9. A door trim panel for an automotive vehicle, said door trim panel comprising:
   an upper panel having a side wall and a support wall extending transversely from said side wall that supports said inner edge of said armrest, said support wall having a distal end;
   a lower panel having a side wall and a support flange extending transversely from said side wall of said lower panel that supports said outer edge of said armrest, said support flange having a distal end, said distal end of said support flange and said distal end of said support wall having a frangible connection to allow transverse displacement of said support flange relative to said support wall during a side vehicle impact; and
   an armrest having a bottom surface, said bottom surface having a plurality of grooves to allow said armrest to buckle transversely during said transverse displacement of said support flange relative to said support wall and, thereby, absorb energy associated with the side vehicle impact.

10. A door trim panel as set forth in claim 9, wherein each of said plurality of grooves has a generally V-shaped cross section.

11. A door trim panel as set forth in claim 10, wherein said armrest includes a plurality of support ribs projecting from said bottom surface of said armrest.

12. A door trim panel as set forth in claim 11, wherein said plurality of support ribs are spaced apart and said plurality of grooves are disposed therebetween.

\* \* \* \* \*